(12) United States Patent
Berg et al.

(10) Patent No.: US 8,492,983 B1
(45) Date of Patent: Jul. 23, 2013

(54) SYSTEM AND METHOD TO ADDRESS AND CONTROL SERIALLY CONNECTED LEDS

(75) Inventors: William C. Berg, Lakeville, MN (US); Matthew J. Loegering, Edina, MN (US)

(73) Assignee: Analog Technologies Corporation, Lakeville, MN (US)

( * ) Notice: Subject to any disclaimer, the term of this patent is extended or adjusted under 35 U.S.C. 154(b) by 209 days.

(21) Appl. No.: 13/105,762

(22) Filed: May 11, 2011

Related U.S. Application Data

(60) Provisional application No. 61/333,562, filed on May 11, 2010.

(51) Int. Cl.
*H05B 37/00* (2006.01)

(52) U.S. Cl.
USPC ......... 315/185 R; 315/312; 315/307; 315/291

(58) Field of Classification Search
USPC ................. 315/312, 323, 324, 291, 294, 297, 315/307, 185 R, 185 S, 192
See application file for complete search history.

(56) References Cited

U.S. PATENT DOCUMENTS

| | | | |
|---|---|---|---|
| 6,777,891 B2 | 8/2004 | Lys et al. | |
| 7,462,103 B2 | 12/2008 | Mattice et al. | |
| 7,605,547 B2 | 10/2009 | Ng | |
| 7,994,723 B2 * | 8/2011 | Budde et al. | 315/90 |
| 8,344,659 B2 * | 1/2013 | Shimomura et al. | 315/307 |
| 8,400,061 B2 * | 3/2013 | Kuang et al. | 315/77 |

* cited by examiner

*Primary Examiner* — James H Cho
(74) *Attorney, Agent, or Firm* — Dicke, Billig & Czaja, PLLC

(57) ABSTRACT

This application relates to the systems and methods for networking and control of lighting systems. In particular, this application relates to the addressing and control of light emitting diodes (LEDs) connected serially on a bus within a network of serially bussed LEDs. The approaches described in this application simplify and lower the cost of control by distributing the control functions between a serial bus controller and controllers associated with individual LEDs or LED circuits on the serial bus. Hardware intensive decoding of predefined addresses, or time consuming address processing and determining algorithms, are not employed. Instead, the addressing method disclosed both simplifies the system by reducing hardware requirements and improves the speed of the data packets and reduces packet latency moving down the serial bus.

14 Claims, 8 Drawing Sheets

Network of Individually Controlled LEDs

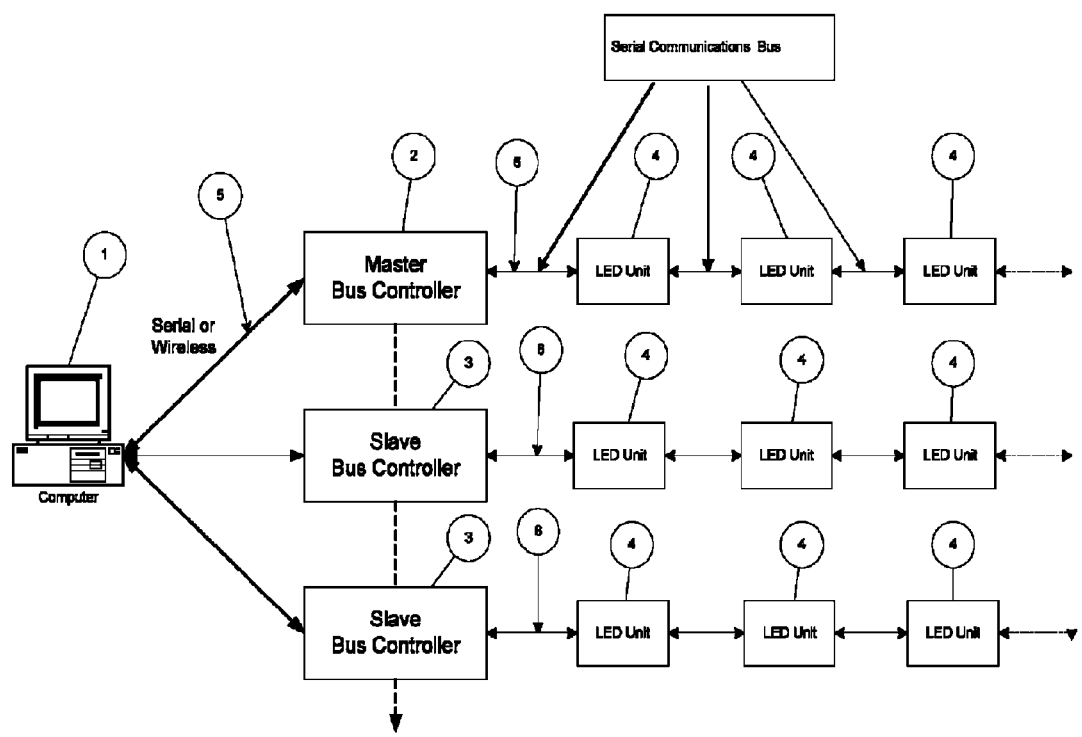
Fig. 1   Network of Individually Controlled LEDs

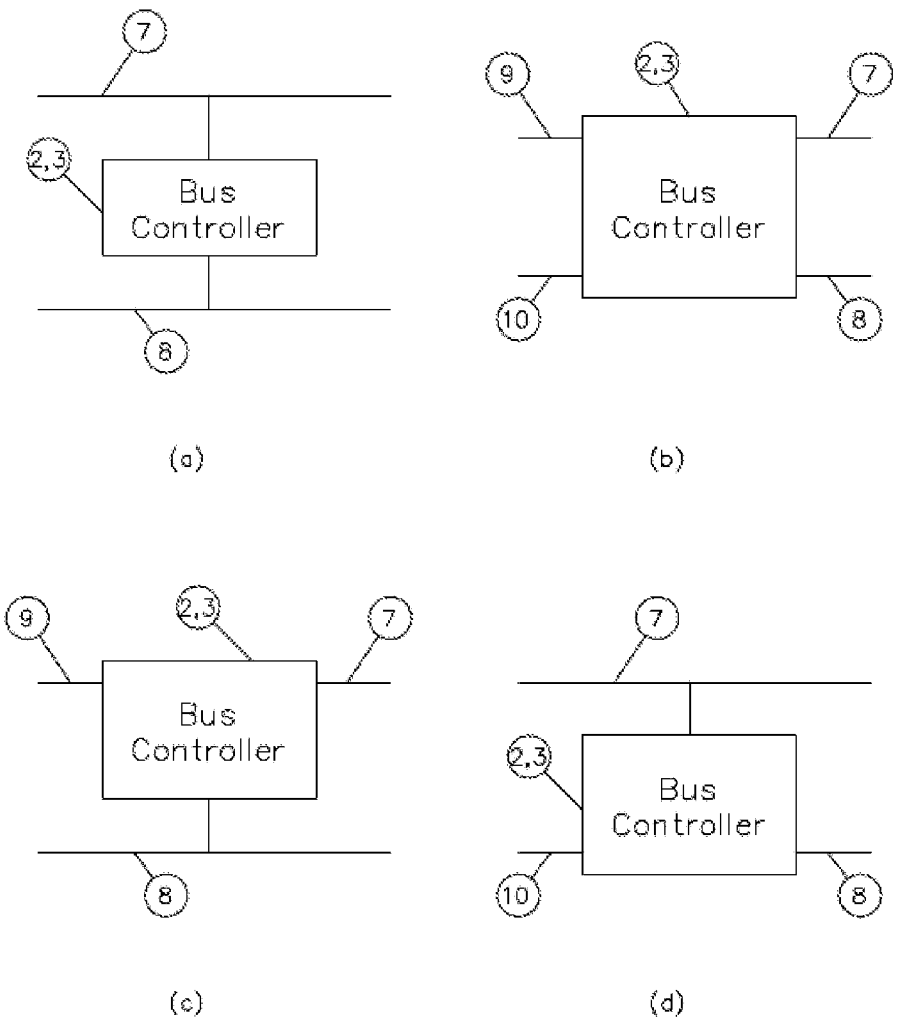
Figure 2. Bus Controller Power Connections

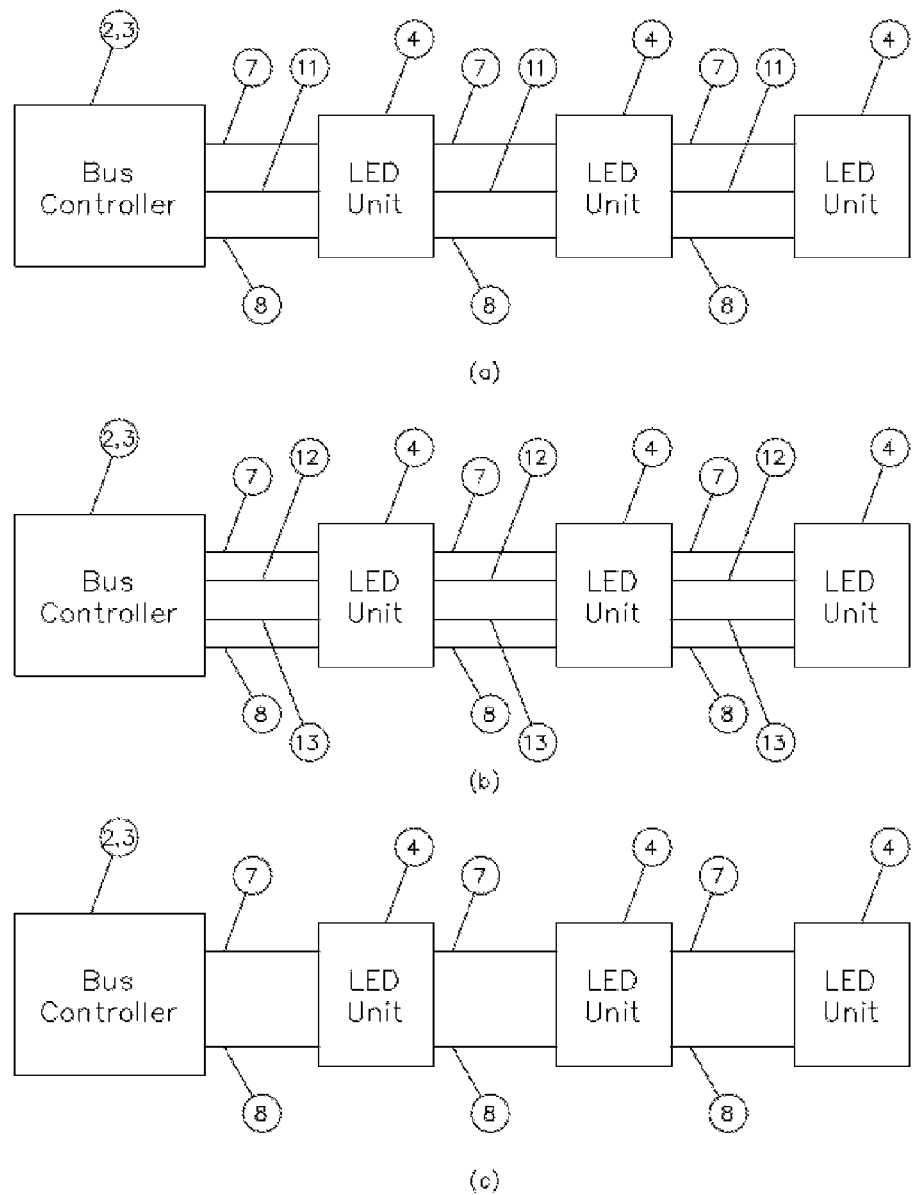
Figure 3. Bus Controller Data Connections

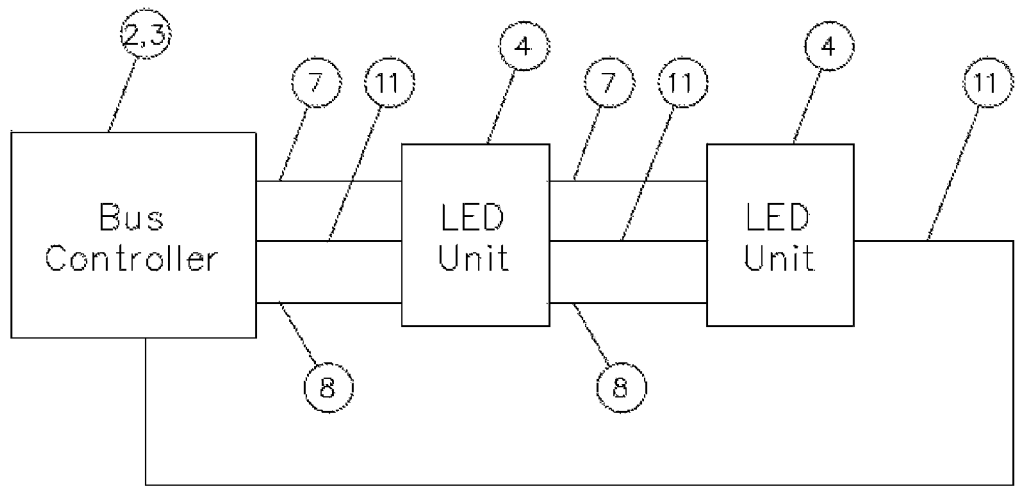
Figure 4. Bus Controller Loop Data Connection
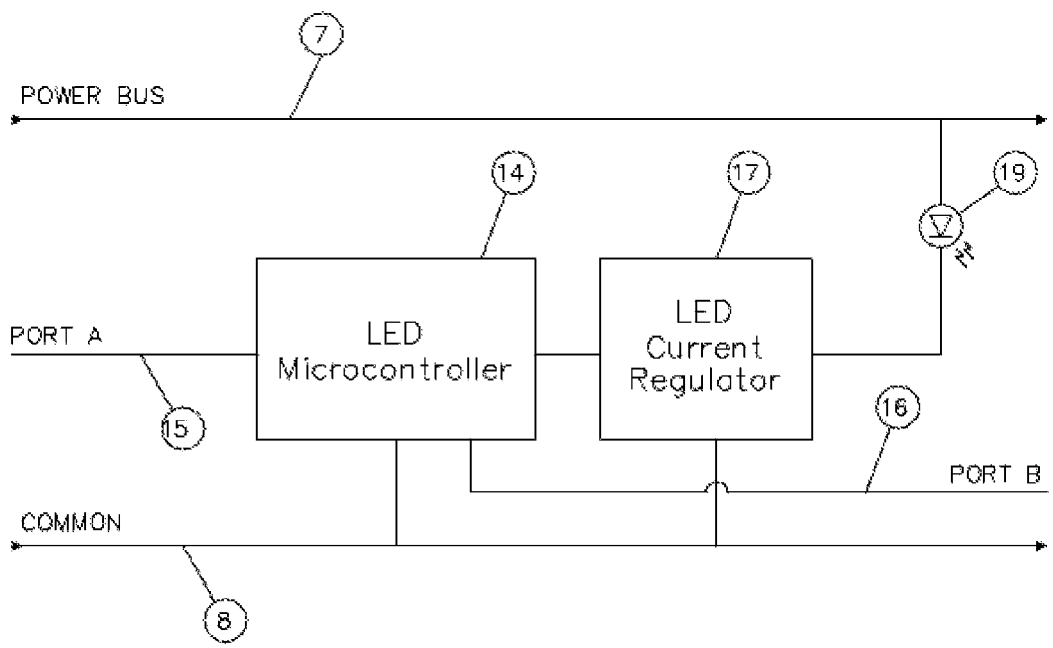
Figure 5. LED Unit with One LED

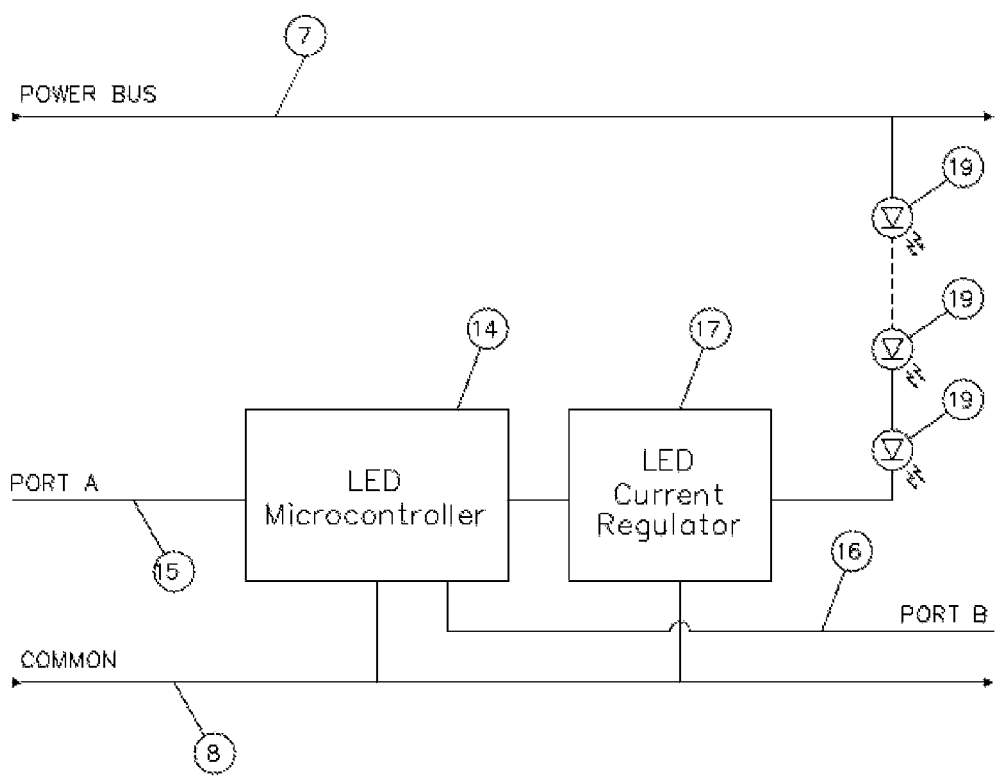
Figure 6. LED Unit with Multiple Serial LEDs

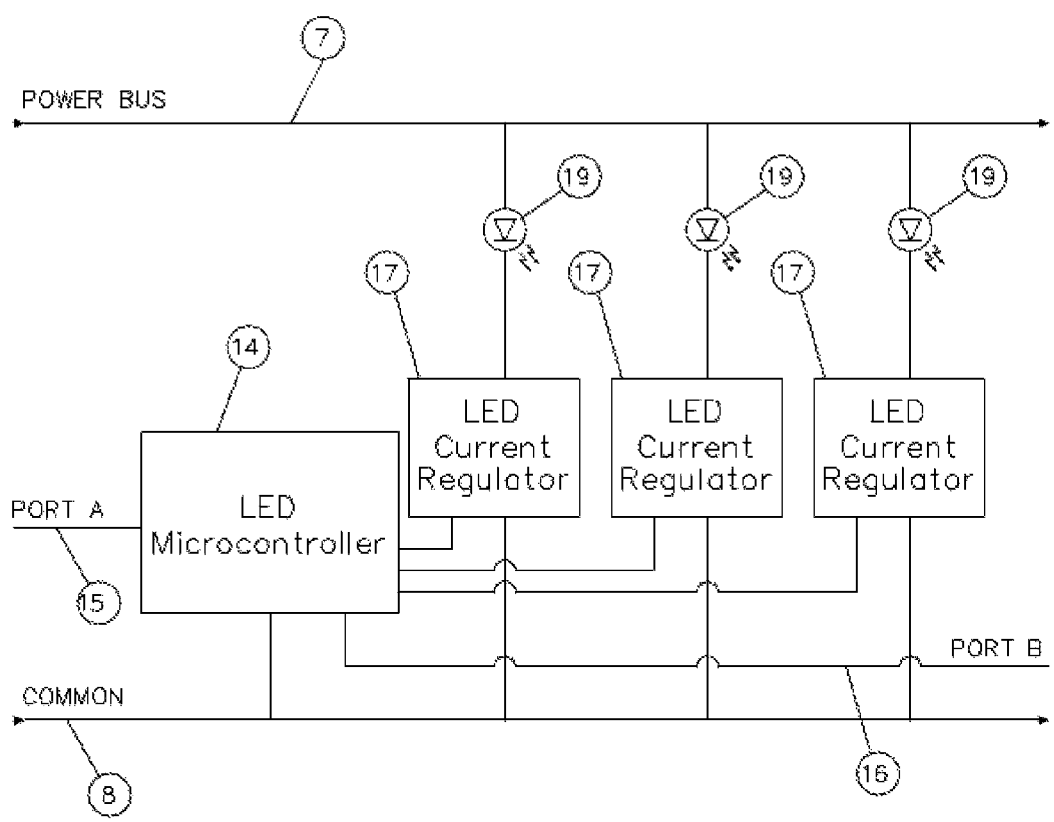
Figure 7. LED Unit with Multiple Parallel Connected LEDs

SYSTEM AND METHOD TO ADDRESS AND CONTROL SERIALLY CONNECTED LEDS

RELATED APPLICATION

This application claims the benefit of U.S. provisional patent application No. 61/333,562 filed May 11, 2010.

TECHNICAL FIELD

This application relates to the systems and methods for networking and control of lighting systems. In particular, this application relates to the addressing and control of light emitting diodes (LEDs) connected serially on a bus within a network of serially bussed LEDs.

BACKGROUND

There are many applications including (but not limited to) decorative lighting, entertainment lighting, signage, and general lighting in which individual lights or groups of lights are to be controlled independently of each other to produce a variety of lighting effects. Light emitting diodes (LEDs) are particularly well suited to these applications because of their low power consumption, small size, and fast response time. One possible control topology is to connect and control a series of LEDs using a serial data bus.

Current serially controlled lighting systems employ inefficient addressing methods, which include hardware intensive decoding of predefined addresses or time consuming address processing and determination algorithms. Examples include those disclosed in U.S. Pat. Nos. 6,777,891; 7,462,103; and 7,605,547; each of which is incorporated by reference into this application for their disclosure of general principles and terminology.

U.S. Pat. No. 6,777,891 discusses a method of addressing nodes on a serial data bus which does not require pre-assignment of addresses to the various nodes, but the packet structure is very inefficient, as it requires each packet, when transmitted by the master bus controller, to contain a field for every node on the bus. Each node then strips one field off the packet before forwarding it to the next node. Packets are thus large and therefore require more time to traverse the bus. Also, nodes cannot be addressed randomly since each packet must contain a field for each node on the bus.

U.S. Pat. No. 7,462,103 discusses an addressing method similar to that of U.S. Pat. No. 6,777,891; only in the case of this patent the various nodes on the serial data bus are treated as shift registers. Each packet contains a field for each node on the bus, but the packet does not become any shorter as it traverses the bus. As for U.S. Pat. No. 6,777,891, nodes cannot be addressed randomly since each packet must contain a field for each node on the bus.

U.S. Pat. No. 7,605,547 discusses a method of addressing nodes on a serial data bus which requires each node to have its particular address set in hardware, by switches, jumpers, or other means. This method supports random addressing. However, since each node's address must be configured in hardware, this method is poorly suited to systems which contain many nodes.

None of the mentioned patents contain any provision for detection of or compensation for conditions of excessive current draw by the various nodes. Neither do any of the mentioned patents contain any provision for detection of or compensation for conditions of excessive heat generation by the various nodes.

SUMMARY

The approaches described in this application simplify and lower the cost of control by distributing the control functions between a serial bus controller and controllers associated with individual LEDs or LED circuits on the serial bus. Existing addressing methods include hardware intensive decoding of predefined addresses or time consuming address processing and determining algorithms. The addressing method disclosed simplifies the system by reducing hardware requirements, improves the speed of the data packets, reduces packet latency, and provides for packet propagation latency compensation. Improved speed and decreased packet latency allows for more devices on a serial bus and or faster flashing or blinking rates. Distributing control between a bus controller and the individual LED controller also reduces costs and improves packet speed on the bus. The bus controller contains a higher performance processer in terms of processing speed and available memory. One bus controller can service several LED controllers on a serial bus. Since the small and simple processors used to address and control the LEDs cost less, the overall system costs less. The higher performance bus controller processes data considerably faster than the LED controller. The bus controller executes illumination routines and sequences by setting the bus packet rate, communicating each LED's intensity, and setting duration and illumination order on the bus. The smaller and simpler LED controller decodes addresses using an efficient algorithm, executes simple commands, and performs other tasks. Packet propagation latency compensation permits the LED Units to appear to be controlled simultaneously.

One approach to accomplishing these objectives provides a system for controlling LEDs, in which each LED or group of LEDs is controlled by a simple microcontroller, and a plurality of these LED/microcontroller units is connected together via a uni-directional or bi-directional serial data bus, controlled by a master bus controller. A novel scheme for addressing the LED/microcontroller units on the serial data bus simplifies and lowers the cost of the LED/microcontroller units. Multiple novel synchronization schemes provide compensation for latency in the serial data bus, such that the various LED/microcontroller units may be made to respond simultaneously to their respective commands. Multiple novel schemes permit protection against and compensation for conditions in which LED/microcontroller units draw too much current or dissipate too much heat.

The approaches described here thus relate to control of individual LEDs or groups of LEDs (referred to as LED Units) connected together by a serial data bus, and controlled by data packets which are transmitted over the bus from a master controller (referred to as a Bus Controller). Packets which are transmitted over the bus by the Bus Controller will contain an address field, which identifies the LED Unit for which the packet is intended. Each LED Unit, upon receiving a packet, tests the address field to see if it belongs to the set of one or more addresses to which the LED Unit responds. If it does, the LED Unit acts on the command encoded in the packet. Each LED Unit retransmits all packets to the LED Unit which is next further from the Bus Controller. When retransmitting packets, LED Units will usually modify the address field, so that as the packet traverses the bus its address field changes at each node. The address with which the packet begins transit on the bus is chosen by the Bus Controller so that when the packet arrives at the intended LED Unit, its address has been modified by the intervening LED Units to match the set of addresses to which the intended LED Unit responds. In this way, each LED Unit can be addressed without the need for pre-assignment of its address via switches or other means, as each LED Unit's address is determined automatically by its position on the serial data bus. The simplicity of the packet structure permits small, fast packets to be used, which maximize system bandwidth. Also, LED Units can be addressed randomly.

Furthermore, the disclosed system of packet processing employed by LED Units introduces very little latency in packet transmission, because each LED Unit can process and retransmit each packet bit without waiting for the complete packet to be received. Thus, packets can traverse the bus very quickly, which permits more LED Units on a serial data bus and faster LED Unit update rates.

The disclosed system also permits the serial data bus to carry packet traffic in both directions, so traffic is not merely transmitted from the Bus Controller to LED Units, but also from the LED Units to the Bus Controller, and from one LED Unit to another LED Unit. Traffic from LED Units to the Bus Controller can include information about how many LED Units are connected to the serial data bus, and information about each LED Unit.

The Bus Controller can transmit a variety of command packets which may, among other advantages, make better use of the bus bandwidth by specifying more complex LED Unit functions. These command packets may include commands to ramp LED Unit brightness up and down at defined rates. In this way, control functions may be optimally distributed between the Bus Controller and LED Units so as to minimize system cost and maximize system performance.

The disclosed system also permits the Bus Controller to save combinations of commands for the LED Units connected to its serial data bus and synchronization commands for other Bus Controllers in the Bus Controller's non-volatile memory for later execution.

Undesirable and possibly dangerous conditions in which the LED Units draw more current than the system's power supply can source, or in which the LED Units generate more heat than the system can dissipate, can be prevented in a variety of ways by the disclosed system.

In some embodiments, the Lighting System may be comprised of a computer system with user interface software, an interface to connect serial bus controllers, and serial buses to connect individual LED controllers associated with single or multiple LEDs connected in series or parallel. The network of LEDs consists of a plurality of serial bus controllers with their respective serially connected LED controllers and associated LEDs. The serially connected LED controllers and associated LEDs form a LED unit. The computer system has user interface software used to address, configure, and control each LED unit within a network of LED units by programming a serial bus controller. For each LED unit on a particular serial bus, a user configures individual LED intensity, the time relative to other LEDs in the system to set the individual LED intensity, the duration of time the LED is at this level, and any other relevant parameters. There are two types of serial bus controllers, a Master, and a Slave. The Lighting System allows for initiating LED sequencing and control to start from either the Computer System or the Master Controller. When the computer system originates the sequencing program, the computer downloads the sequencing data to the Master and Slave serial bus controllers. For networks with more than one serial LED bus, the Master Controller synchronizes the Slave Controllers. This is done either through wired connections or wireless connections between the Master and Slave bus controllers. The computer presents a trigger pulse or means to start the Master Controller sequencing program. The Master Controller then immediately outputs a trigger pulse to the Slave Controllers to synchronize their sequencing programs. The networked LEDs can sequence without the computer system after the Master Controller and Slave Controllers are programmed and power is applied. In some applications, the Controllers are factory programmed to run predetermined sequencing programs.

The LED unit consists of a microcontroller, a LED current regulating circuit, and a LED. The microcontroller supports bus communications, performs LED unit address decoding, and modulates the LED's regulated current to control LED intensity. The LED unit shown in Figure, consists of a microcontroller, a LED current regulating circuit, and a plurality of series connected LEDs. The microcontroller supports bus communications, performs LED unit address decoding, and modulates the LED's regulated current to control LED intensity. The LED unit shown in Figure, consists of a microcontroller, a LED current regulating circuit, and a plurality of parallel connected LEDs. The microcontroller supports bus communications, performs LED unit address decoding, and modulates the LED's regulated current to control LED intensity.

Control of individual LED units along a serial bus is shared by the Bus Controller and the and the controller within the LED unit. The Bus Controller utilizes a more powerful microcontroller with considerably more processing capability and memory than the LED unit controller. The LED Unit controller's principal functions are to decode its address, execute simple commands, and retransmit serial data packets. In one embodiment, after decoding its address, the LED unit controller sets a pulse width modulated (PWM) duty cycle used to modulate its regulated current. This determines the intensity of the associated LED or LEDs. The serial Bus Controllers set the intensity level of each LED unit on the serial bus at predetermined times and durations relative to the other LED units on the serial bus. The serial Bus Controllers can transmit data packets at different rates. The transmission rates may correlate to the LED flash or blinking rate. A serial bus routine is completed after each LED unit on the serial bus has been addressed and its command executed. A routine can be set to repeat for a specific time length or indefinitely. The serial Bus Controller may store several different routines with different intensity levels and duration times for the same LED units on the serial bus. The number of routines is limited only by the amount of microcontroller memory. Executing routines for a specific time and in a predetermined order determines a sequence. Sequences can be repeated for a finite time length or indefinitely.

The serial Bus Controller transmits data packets down the serial bus. Each LED unit controller detects the data packets, decodes and processes the address data, passes on the packet to the next LED unit controller, and executes commands associated with the packets at its address. Each LED unit does not have or need a predefined address. Its effective address is determined by its location on the serial bus. A small time latency is introduced when processing packet addresses, but the data rate is not affected.

In a preferred embodiment, a system for controlling a plurality of LEDs comprises one or more serial data busses to convey binary digital information. The system further comprises a Bus Controller, which controls one or more LED Units, which in turn are connected to each other and to the Bus Controller via a serial data bus. The Bus Controller executes user-defined programs which describe the behavior of the various LED Units in terms of brightness, time, and any other relevant parameters. In addition there are one or more LED Units, each of which has two data ports: port A, which faces the Bus Controller on the serial data bus, and port B, which faces away from the Bus Controller on the serial data bus. Each of the LED Units performs the functions of: (i) receiving on port A data packets comprised of an address field and a data field; (ii) retransmitting on port B packets which have been received on port A, after modifying (e.g., decrementing) the address field by one; and (iii) controlling the brightness of the LED Unit's associated one or more LEDs based on the one or more commands encoded in the data field of packets which are received on port A of the LED Unit and which have an address field of zero.

In another preferred embodiment, a method of controlling a plurality of LEDs employs one or more serial data busses to convey binary digital information. In the method, a Bus Controller controls one or more LED Units, which in turn are connected to each other and to the Bus Controller via a serial data bus. The Bus Controller executes user-defined programs which describe the behavior of the various LED Units in terms of brightness, time, and any other relevant parameters. The LED Units may each have two data ports: port A, which faces the Bus Controller on the serial data bus, and port B, which faces away from the Bus Controller on the serial data bus. The method includes each of the LED Units: (i) receiving, on port A, data packets comprised of an address field and a data field; (ii) retransmitting, on port B, packets which have been received on port A, after decrementing the address field by one; and (iii) controlling the brightness of the LED Unit's associated one or more LEDs based on the one or more commands encoded in the data field of packets which are received on port A of the LED Unit and which have an address field of zero.

BRIEF DESCRIPTION OF THE DRAWINGS

The accompanying drawings show a particular embodiment as an example, and are not intended to limit the scope of this disclosure, application, or claim(s).

FIG. 1 is a schematic diagram of a network of individually controlled LEDs.

FIGS. 2a-d are schematic diagrams of various bus controller power connections.

FIGS. 3a-c are schematic diagrams of various bus controller data connections.

FIG. 4 is a schematic diagram of a bus controller loop data connection.

FIG. 5 is a schematic diagram of a LED unit with one LED.

FIG. 6 is a schematic diagram of a LED unit with multiple series connected LEDs.

FIG. 7 is a schematic diagram of a LED unit with multiple parallel connected LEDs.

DETAILED DESCRIPTION

Figure 8:
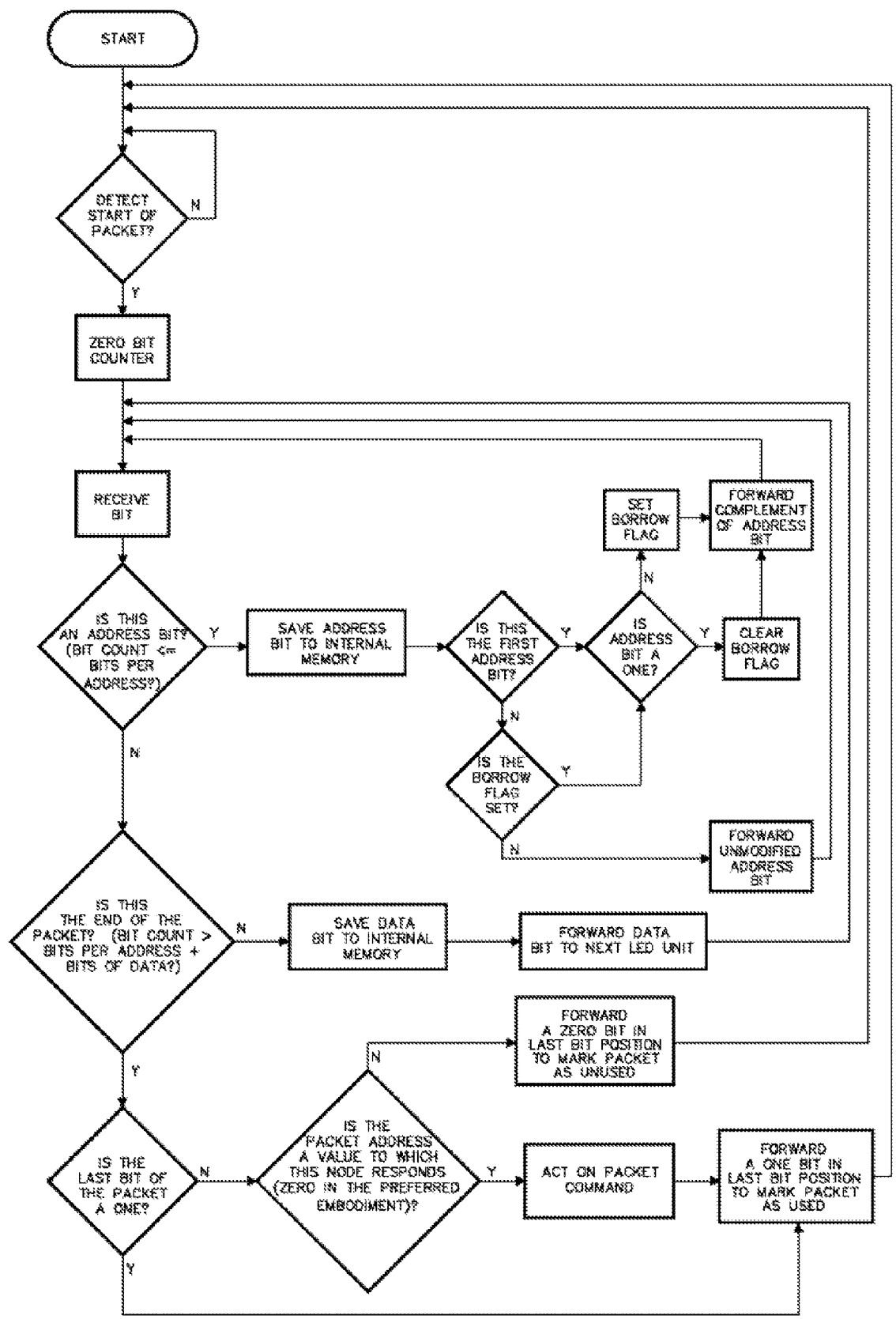
FIG. 8 is a flowchart of a preferred embodiment of data processing.

The Lighting System is shown in FIG. 1. The Lighting System is composed of a Computer System 1, which is used to program and control Bus Controllers 2 and 3. Each Bus Controller controls each of the LED Units 4 to which it is connected via its respective serial data bus 6. Each of the LED Units controls one or more LEDs to which it is connected. It can therefore be seen that the overall system is a distributed control system, wherein typically each Bus Controller contains a faster, more sophisticated microcontroller; while the LED Units typically contain cheaper, simpler microcontrollers.

Computer System and User Interface

The Computer System 1 is equipped with User Interface Software, which is used to address, configure, and control each LED Unit 4 within a network of LED units by programming Bus Controllers 2 and 3. A data connection 5 interfaces the Computer System to the Bus Controllers 2 and 3. In the preferred embodiment, a USB (Universal Serial Bus) connection is used to interface the Computer System to one or more of the Bus Controllers. In another embodiment, a wireless connection is used to interface the Computer System to one or more of the Bus Controllers.

The Computer System's User Interface Software permits the user to configure individual LED intensity and timing for each LED Unit. LED intensity may be specified as a constant intensity, or it may be specified in terms of an intensity ramp rate, or in terms of other parameters. The user also sets when each LED Unit's intensity will change, how long each LED Unit will maintain a specified intensity, and any other relevant parameters. Latency compensation can also be programmed via the User Interface Software. The Computer System's User Interface Software permits the user to compose and edit complex programs which describe how the various LED Units will vary their respective intensity and timing. These programs may be saved in and retrieved from the Computer System's local memory for later editing and reuse. Usually, the Computer System will download these programs to the Bus Controllers' memories, and the various Bus Controllers will then execute their respective programs independently of the Computer System. However, it is also possible for the Computer System to send commands to the various Bus Controllers which will be immediately executed by the Bus Controllers, such that the Computer System effectively exercises "real-time" control of the Lighting System.

LED Series Bus Controllers

Referring again to FIG. 1, there are two types of Bus Controllers: Master Bus Controllers 2 and Slave Bus Controllers 3. Each series connected LED bus 6 requires either a Master Bus Controller or a Slave Bus Controller. Each network of LED busses requires at least one Master Bus Controller. In addition to controlling the LED Units which are connected to its serial bus, the Master Bus Controller transmits synchronization information to Slave Bus Controllers, such that the various LED programs which are running on the various Bus Controllers operate in a manner which is synchronized. A Slave Bus Controller will not execute its program as a whole, or certain segments of its program, until it detects a synchronization pulse or data from the Master Bus Controller.

Each Bus Controller sets the intensity level, intensity ramp rate, or other configurable parameters of each LED Unit on the serial bus at predetermined times relative to the other LED Units on the serial bus, and for predetermined durations and/or latencies. The Bus Controllers can transmit data packets at different rates, and thereby vary the rate at which LEDs flash or blink.

Each Bus Controller requires the following connections: power supply, power return (or ground), and a serial bus connection for communication with LED Units. An optional connection is used for communication with other Bus Controllers. FIG. 2 illustrates various power connection arrangements. As shown in FIG. 2a, the power connection will minimally require two connections, one connection for power supply 7 and one connection for ground 8. In this embodiment, power bus 7 and ground 8 also supply power to the various LED Units on the serial data bus. Alternatively, in the preferred embodiment shown in FIG. 2b, four connections may be used, such that the Bus Controller is supplied power by power bus 9 and ground 10, and the LED Units are supplied power by power bus 7 and ground 8. The system shown in FIG. 2b may, in some cases, have the advantage of simplifying interconnection of the Bus Controller and LED Units. FIG. 2c shows a system wherein connection 9 supplies power to the Bus Controller, connection 7 supplies power to the LED Units, and connection 8 supplies ground to both the Bus Controller and the LED Units. FIG. 2d shows a system wherein connection 7 supplies power to both the Bus Controller and the LED Units, connection 10 supplies ground to the Bus Controller, and connection 8 supplies ground to the LED Units.

Referring to FIG. 3a, in the preferred embodiment the Bus Controller's serial data bus connection consists of a single data connection 11 which carries both packet traffic and clock data to synchronize LED Units with the Bus Controller. No other connection is required because the signal return is shared with the power supply ground connection. This single connection can, in the preferred embodiment, carry data in either direction: from the Bus Controller to the LED Units, or from the LED Units to the Bus Controller. In other embodiments, the bus connection may carry traffic in only one direction. Note that power connections 7 and 8 may, in some embodiments, connect to each LED Unit at only one point, similar to the Bus Controller power connections shown in FIG. 2.

In another embodiment, shown in FIG. 3b, the serial bus consists of two connections: a clock connection 12 and a data connection 13; the return connection for both of these signals is again shared with the power supply return. In this embodiment, higher serial bus data rates may be achieved by separating the data and clock signals. The serial bus connection may, in some embodiments, carry data in either direction: from the Bus Controller to the LED Units, or from the LED Units to the Bus Controller. In other embodiments, the bus connection may carry traffic in only one direction. Note that power connections 7 and 8 may, in some embodiments, connect to each LED Unit at only one point, similar to the Bus Controller power connections shown in FIG. 2.

In another embodiment, shown in FIG. 3c, the serial bus data is carried over the voltage supply connection 7. This embodiment requires no dedicated connections for the serial bus, and therefore yields the fewest bus connections, as only two connections are required between each of the LED Units, and between the LED Units and the Bus Controller. The serial bus connection may, in some embodiments, carry data in either direction: from the Bus Controller to the LED Units, or from the LED Units to the Bus Controller. In other embodiments, the bus connection may carry traffic in only one direction.

FIG. 4 shows that in these and other embodiments, it also is possible for the serial data bus, after passing through the last LED Unit on the serial data bus, to connect back to a second serial bus connection on the Bus Controller. Among other advantages, this topology would permit the Bus Controller to detect the number of LED Units on the serial bus by comparing the address fields of transmitted and received packets.

Bus Controllers may, in some embodiments, have additional connections which permit communication between Bus Controllers. In one embodiment, this connection is used by a Master Bus Controller to maintain synchronization with Slave Bus Controllers. Connections between Bus Controllers may be via a variety of different buses, including but not limited to serial buses and RF (radio frequency) buses.

LED Unit

In the preferred embodiment, a LED Unit is comprised of a microcontroller, a LED current regulator, and one or more LEDs arranged in series or parallel. FIG. 5 illustrates one embodiment wherein the regulator circuit 17 sinks a preset current from a single LED 19. The microcontroller 14 supports bus communications, stores latency compensation data, performs LED Unit address decoding, and modulates the LED's current regulator 17 to control LED 19 intensity. FIGS. 6 and 7 illustrate embodiments wherein the same control is applied to multiple LEDs. In some embodiments, an LED Unit may include multiple variously colored LEDs, such that variation of the brightness of the various LEDs produces color variation effects.

Referring to FIGS. 5, 6, and 7, each LED Unit has two ports: port A 15 and port B 16. In the preferred embodiment, port A must always face the Bus Controller. In this way, each LED Unit can expect packet traffic which originates at the Bus Controller to arrive on the LED Unit's port A, and can retransmit the packet on port B.

In another embodiment, each LED Unit automatically detects which of its two ports is facing the Bus Controller, and receives and retransmits packet traffic accordingly.

The LED Unit microcontroller has two principal functions: retransmit received packets to the next LED Unit in the string, and act on command data contained in packets which are addressed to this LED Unit. In a simple embodiment, the command data contained in a packet corresponds to a command to set the intensity level of the LED Unit's associated LED. The LED Unit's microcontroller may set the LED intensity by modulating the regulated LED current. In the preferred embodiment, the microcontroller pulse width modulates (PWMs) the regulated current. Other modulation schemes can be used and PWM is not required. The LED current regulator sets the maximum current sunk from or sourced to one or more associated LEDs.

To avoid having to pre-assign addresses to the individual LED Units, the LED Units are programmed to respond only to a set of one or more addresses. Each LED Unit modifies the address field of each packet before retransmitting it to the next LED Unit on the bus. The Bus Controller chooses the packet's initial address such that, by the time the packet arrives at the target LED Unit, its address field has been modified by intervening LED Units to match the set of addresses to which the target LED Unit responds. As a result, LED Units may be addressed by the Bus Controller in any order, that is, randomly.

In the preferred embodiment the LED Units respond only to an address value of zero, and retransmit the address bits such that the forwarded address field is decremented by one. So, for example, to address the fifth LED Unit in a string, the Bus Controller will set the initial packet address field to four. The process by which an LED Unit's microcontroller decrements the address field is carried out using conventional binary arithmetic: The address field is received least-significant-bit (LSB) first, and the first bit, if one, is switched to a zero and retransmitted, while simultaneously the microcontroller's internal borrow flag is cleared. If the received address bit is zero, it is switched to a one and retransmitted, while simultaneously the microcontroller's internal borrow flag is set. Subsequent address bits are retransmitted without modification if the borrow flag is clear, or switched if the borrow flag is set. The microcontroller's borrow flag is cleared after a one bit is received, or after the complete address field has been processed, whichever comes first. After the borrow flag has been cleared, any subsequent address bits associated with this packet are retransmitted without modification.

The LED Unit's microcontroller decrements and retransmits the address field as it is received, rather than waiting until the entire field has been received. As a result, when a packet is received which has an address field which is zero, the retransmitted address field will be all ones (since, in binary arithmetic, subtracting one from a field of all zeroes results in a field of all ones). In this case, the LED Unit's microcontroller's borrow flag can be appended to the retransmitted packet for use by subsequent LED Unit's as a validation field (a set borrow bit would indicate the packet was intended for a prior LED Unit), but is not necessary.

Each packet bit, regardless of whether it is part of the address field or the data field, is retransmitted to the LED Unit's data output port as soon as processing of that bit is complete. As a result, the packet transmission latency time introduced by each LED Unit is limited to the time required by an LED Unit to process a single bit.

In some embodiments, packets may travel either way on the serial bus. In the preferred embodiment, the Bus Controller sends a query command packet which informs each LED Unit that receives it that the LED Units are to be return configuration data to the Bus Controller. Each LED Unit's microcontroller, upon receiving this packet, ignores the address field (since the command applies to all receiving LED Units) and retransmits the packet to the next LED Unit on the serial bus. Each LED Unit, after determining that a query command has been received, drives its port A to an active signal state to signal to the preceding LED Unit that a LED Unit is present on the preceding LED Unit's port B. Also, each LED Unit, after retransmitting the query packet to the next LED Unit on the string, monitors its port B for an active signal state to determine if a LED Unit is connected. If, after a pre-determined interval has elapsed, a LED Unit does not detect an active signal state on its port B, that LED Unit knows that it is the last LED Unit on the serial data bus. That LED Unit will then initiate transmission of a packet from its port A to the preceding LED Unit. The packet will contain data about the LED Unit, which the preceding LED Unit will pass along to the next preceding LED Unit, along with further appended data that describes the preceding LED Unit. In this way, all LED Units return data about themselves and other LED Units on the serial data bus to the Bus Controller. After returning the query response data, the LED Units return to normal operation where data is received on port A and retransmitted on port B.

Depending on the data rate of the serial bus and the number of LED Units in the string, there may be noticeable latency in the data bus. For example, if all LEDs in the string are initially turned off, and a packet must be transmitted to each LED Unit to command that LED Unit to turn on its associated LEDs, the time required to transmit all command packets to all LED Units may cause an observable delay between the first LED Unit turning on its associated LEDs and the last LED Unit turning on its associated LEDs. This observable delay may be an unwanted effect, and can be eliminated in several ways.

In the first method, blocks of addresses are set aside as broadcast addresses. To illustrate this method, take as an example the preferred embodiment wherein each LED Unit responds to an address of zero, and each LED Unit decrements each packet's address field before retransmitting the packet. If a string of LED Units contains 64 LED Units, addresses zero through 63 would be used to address the 64 LED Units individually. Addresses 64 through 127 would be used to address all of the LED Units on the string with a single packet. To command all LED Units on the string simultaneously, the Bus Controller would transmit a command packet with an address of 127, which would propagate down the string of LED Units as normal, with each LED Unit's microcontroller decrementing the address by one before retransmitting it. Since the address received by each LED Unit's microcontroller is in the range of 64 to 127, each LED Unit knows the packet is to be acted on as if it were addressed to that LED Unit particularly, and thus all LED Units can be controlled with a single packet. Which blocks of addresses are to be set aside as broadcast address blocks may, in one embodiment, be set statically (when the LED Unit microcontrollers are programmed during production). In another embodiment, broadcast address blocks may be set dynamically (by a special command packet transmitted by the Bus Controller to some or all of the LED Units). Or, in yet another embodiment, a combination of static and dynamic programming may be used.

In another method, each packet contains a flag which indicates whether it is a broadcast packet. The flag is the first bit of the packet. If the flag is clear, it indicates that a regular address field and data field follow. If the flag is set, it indicates that the packet is a broadcast packet which does not require address processing, and each LED Unit will respond to the packet's command.

In another method, each LED Unit delays executing its most recently received command until a command has been transmitted to each LED Unit on the serial data bus. In one embodiment of this method, each LED Unit will be informed via a special command packet sent from the Bus Controller of how many command packets the LED Unit must forward after receiving its command packet before it will execute its most recently received command. In another embodiment, each LED Unit will be informed via a field in its most recently received command packet of how many command packets the LED Unit must forward after receiving its command packet before it will execute its most recently received command. In this way, all LED Units will carry out their respective commands at approximately the same time.

In another method, LED Units wait to carry out their respective commands until a special execute packet has been received, which is addressed to some or all LED Units. In the preferred embodiment every command packet has a field which specifies whether the command encoded in the packet is to be executed immediately upon reception, or is to be stored for the moment, and executed only after a special execution packet has been received. In this way, whichever LED Units are to be commanded simultaneously are first sent their respective commands, but are instructed by their respective command packets to wait to execute these commands until a special execution packet is received. This packet is propagated to all LED Units on the bus, resulting in the various LED Units executing their respective commands at approximately the same time.

LED Units may recognize a variety of commands. In the simplest embodiment, the Bus Controller transmits commands which are interpreted as a static intensity level. If the LED Unit is to smoothly transition its LED brightness from one level to another, the Bus Controller must transmit commands to the LED Unit for each discrete brightness level in the transition.

In another embodiment, the LED Unit can accept another type of command from the Bus Controller, which specifies a rate at which the LED will transition its brightness. The Bus Controller then only has to specify the brightness transition rate with a single command, and, when enough time has elapsed for the LED to transition to the desired brightness, the Bus Controller transmits another command specifying that the transition is to end. The ramp rate may be a fixed linear rate, or it may be an exponential or piece-wise linear approximation of an exponential transition rate which better approximates the perceived brightness transition curve of the human eye, or it may follow some other ramping profile.

As the forgoing description of packet formats demonstrates, control functions may be distributed between the Bus Controller and LED Units in such a way as to make optimal usage of the speed and memory resources of the various Bus Controller and LED Unit microcontrollers. Hence, the Lighting System's flexibility can be used to maximize overall system performance and to minimize overall system cost.

In some embodiments, the LED Units on a particular bus may, if some or all LED Units are commanded to high or full brightness at the same time, draw more current than the bus's power supply is capable of sourcing (referred to herein as an over-current condition), or may generate more heat than the system is capable of dissipating (herein referred to as an over-temperature condition).

In one embodiment, both over-temperature and over-current conditions may be prevented by analyzing a Bus Controller's program with the User Interface Software on the Computer System before running the program. The User Interface software can be designed to calculate total power and current usage based on the configuration of the Lighting System, determine whether safe and normal operating limits will be exceeded, and suggest changes to the program or Lighting System to prevent over-current and over-temperature conditions.

In another embodiment, the Bus Controller may calculate current usage and/or heat dissipation based on the configuration of the Lighting System while is running a program, and take appropriate action to avoid over-current and/or over-temperature conditions In another embodiment, each LED Units may monitor its own current and/or temperature. The LED Unit may then either take action as necessary to avoid an over-current or over-temperature condition, or return temperature or current data to the Bus Controller to act on as necessary.

In the preferred embodiment, power is supplied to the bus controller, and is distributed along the bus in a serial manner. In another embodiment, multiple power supplies may be connected used at various points on the bus to prevent the bus's power rail from sinking too far due to resistive losses.

Data Packet Structure

Figure 9:
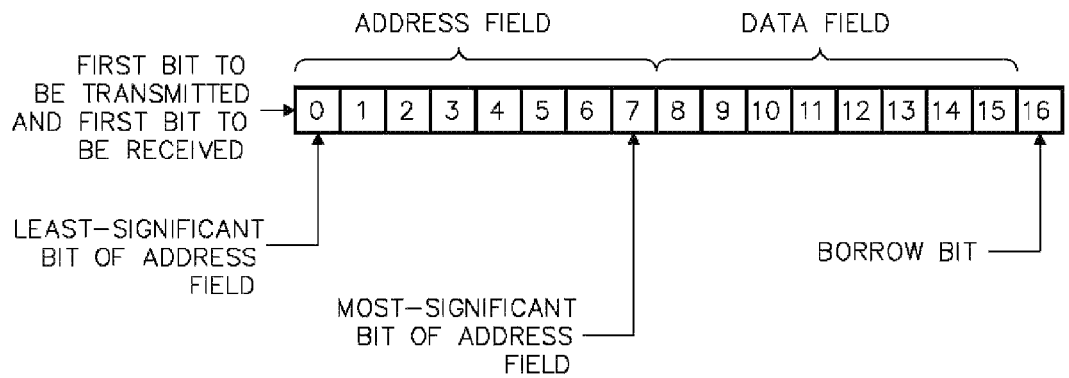
FIGS. 9 and 10 are schematic diagrams of various data packet structures.
Figure 10:
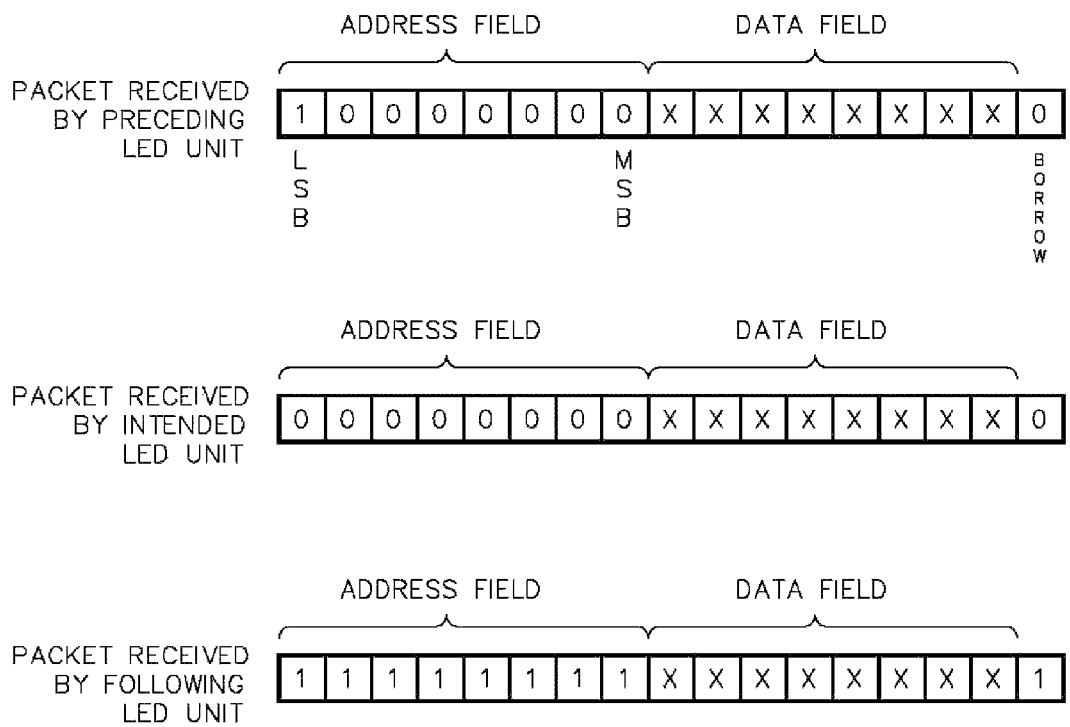

The data packet structure may be as illustrated in FIGS. 8 and 9, but these are only examples. For example, referring to FIG. 8, the data packet may have a 17-bit structure (i.e., bits 0 to 16) with bits assigned as follows. Eight-bit Address Field: 0 (least significant) to 7 (most significant); Eight-bit Data Field: 8 (least significant) to 15 (most significant); Borrow Bit: 16. In this example, the manner in which packets are processed at three various points is reflected in the three diagrams of FIG. 9.

General Considerations

While the forgoing description applies to a network for control of LEDs used in lighting and signaling applications, it shall not be construed to limit the invention to this particular application, as its principles can readily be seen to be applicable to a variety of distributed control applications, wherein the various nodes which are subject to control by the serial data bus may be either consumers of data, or generators of data, or both consumers of data and generators of data. The invention is defined by the claims.

The entirety of this application should be understood as an interchangeable disclosure of methods and systems, i.e., specific disclosures of systems include a disclosure of systems as well as methods, and vice versa.

We claim:

1. A system for controlling a plurality of LEDs, comprising one or more serial data busses to convey binary digital information, comprising:
    a) a Bus Controller, which controls one or more LED Units, which are connected to each other and to the Bus Controller via a serial data bus, and which Bus Controller executes user-defined programs which describe the behavior of the various LED Units in terms of brightness, time, and any other relevant parameters;
    b) one or more LED Units, each of which has two data ports: port A, which faces the Bus Controller on the serial data bus, and port B, which faces away from the Bus Controller on the serial data bus and each of which LED Units performs the functions of:
        i) receiving on port A data packets comprised of an address field and a data field;
        ii) retransmitting on port B packets which have been received on port A, after modifying the address field by one;
        iii) controlling the brightness of the LED Unit's associated with one or more LEDs based on the one or more commands encoded in the data field of packets which are received on port A of the LED Unit and which have an address field which is set to a value which is expected by the LED Unit.

2. The system of claim 1, wherein said Bus Controllers are organized into two classes: master controllers, which generate synchronization information; and slave controllers, which receive synchronization information, such that the various slave controllers are all synchronized with a single master controller by synchronization information which is transmitted by a master controller.

3. The system of claim 1, wherein said LED Units retransmit on port B each bit comprising packets received on port A after processing that bit, without waiting for any subsequent bits to be received, and thereby introduce latency on the serial data bus corresponding to the duration of a single bit.

4. The system of claim 1, wherein said LED Units may also receive packets on port B (the port which faces away from the Bus Controller on the serial data bus), and retransmit those packets on port A (the port which faces towards the Bus Controller on the serial data bus).

5. The system of claim 1, wherein each LED Unit waits to carry out its most recent respective command until a number of commands subsequent to the LED Unit's most recent command have been forwarded by the LED Unit, and wherein said number of commands is specified by a prior command packet which was addressed to the LED Unit.

6. The system of claim 1, wherein each LED Unit waits to carry out its most recent command until a number of commands subsequent to the LED Unit's most recent command have been forwarded by the LED Unit, and wherein said number of commands is specified in the command packet which was most recently addressed to the LED Unit.

7. The system of claim 1, wherein said LED Units wait to carry out their respective commands until instructed to do so by a special command packet transmitted over the serial data bus by the Bus Controller (which is recognized by all LED Units regardless of their address), and said LED Units are thereby caused to carry out their respective commands at approximately the same time.

8. The system of claim 1, wherein a Bus Controller program is created using a User Application Software running on a Computer System prior to being downloaded to a Bus Controller, such that possible cases in which total current draw by the LED Units in a system is excessive are detected by an analysis of the Bus Controller program by the User Application Software.

9. The system of claim 1, wherein a Bus Controller program is created using a User Application Software running on a Computer System prior to being downloaded to a Bus Controller, such that possible cases of excessive heat generation by the LED Units are detected by an analysis of the Bus Controller program by the User Application Software.

10. The system of claim 1, wherein cases in which total current draw by the LED Units in a system is excessive are detected by the Bus Controller while running a program, and the Bus Controller is designed to take appropriate action to correct the over-current condition.

11. The system of claim 1, wherein cases of excessive heat generation by the LED Units are detected by the Bus Controller while running a program, and the Bus Controller is designed to take appropriate action to correct the over-current condition.

12. The system of claim 1, wherein each LED Unit monitors its temperature, and either takes appropriate action to control its temperature, or returns temperature data to the Bus Controller.

13. The system of claim 1, wherein each Bus Controller saves program information regarding control of the brightness, timing, and other parameters related to its LED Units; information regarding synchronization with other Bus Controllers; and any other programmable information in the Bus Controller's internal non-volatile memory.

14. A method of controlling a plurality of LEDs connected with serial data busses which convey binary digital information, comprising:
   a. providing a Bus Controller to control at least one LED Unit connected to the Bus Controller via one of the serial data busses, by executing on the Bus Controller a user-defined program to control the behavior of various LED Units;
   b. each of the LED Units: (i) receiving data packets comprised of an address field and a data field; (ii) retransmitting packets after decrementing the address field by one; and (iii) controlling the behavior of at least one LED associated with the LED Unit based on at least one commands encoded in the data field of packets which have an address field which is set to a value to which the LED Unit is programmed to respond.

\* \* \* \* \*